Figure 1:
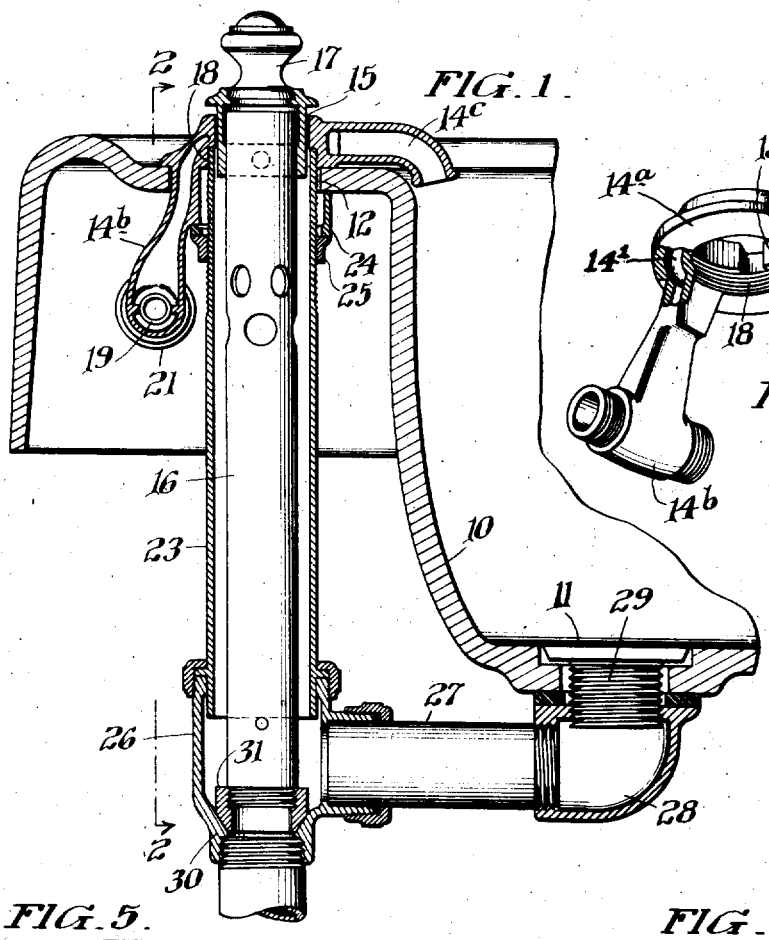

W. A. SPEAKMAN.

COMBINATION SUPPLY AND WASTE FIXTURE FOR LAVATORIES.

APPLICATION FILED MAY 19, 1915.

Reissued July 6, 1915.

13,943.

2 SHEETS—SHEET 1.

Inventor

Willard A. Speakman

Witness

Daniel Webster Jr.

John E. Hubbell

By Frank T. Chambers his Attorney

W. A. SPEAKMAN.

COMBINATION SUPPLY AND WASTE FIXTURE FOR LAVATORIES.

APPLICATION FILED MAY 19, 1915.

Reissued July 6, 1915.

13,943.

2 SHEETS—SHEET 2.

Witness

Daniel Webster, Jr.

John E. Hubbell

Inventor

William A. Speakman

By Francis T. Chambers his Attorney

UNITED STATES PATENT OFFICE.

WILLARD A. SPEAKMAN, OF WILMINGTON, DELAWARE, ASSIGNOR TO SPEAKMAN SUPPLY & PIPE CO., OF WILMINGTON, DELAWARE, A CORPORATION OF DELAWARE.

COMBINATION SUPPLY AND WASTE FIXTURE FOR LAVATORIES.

13,943. Specification of Reissued Letters Patent. Reissued July 6, 1915.

Original No. 1,086,949, dated February 10, 1914, Serial No. 796,858. Application for reissue filed May 19, 1915. Serial No. 29,246.

*To all whom it may concern:*

Be it known that I, WILLARD A. SPEAKMAN, a citizen of the United States, and a resident of Wilmington, in the county of Newcastle and State of Delaware, have invented certain new and useful Improvements in Combination Supply and Waste Fixtures for Lavatories, of which the following is a true and exact description, reference being had to the accompanying drawings which form a part thereof.

This invention relates to plumbing fixtures and has particular reference to attachments for lavatories, bathtubs or the like.

Among the objects of the invention is to provide a combination hot and cold water fixture for lavatories of an unusually simple and neat design whereby the manipulation of the fixture is facilitated and the device rendered more reliable than previous devices.

A further object of the invention is to provide a water supply fixture for lavatories which is adapted to be used in connection with standard basins without alteration thereof.

The foregoing and other objects of the invention will hereinafter be more fully described and claimed and illustrated in the drawings forming a part of this specification in which like characters of reference indicate corresponding parts in all views, and in which—

Figure 8:
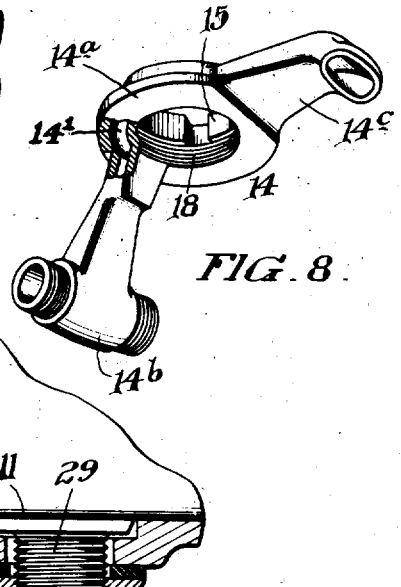
Figure 5:
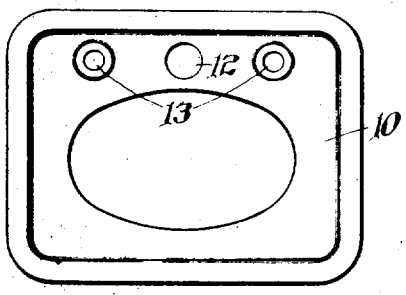
Figure 6:
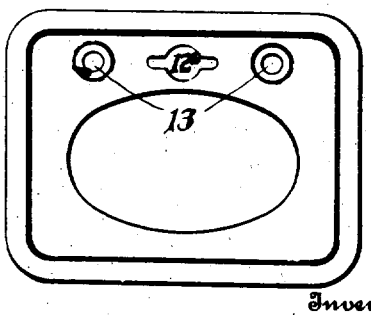
Figure 2:
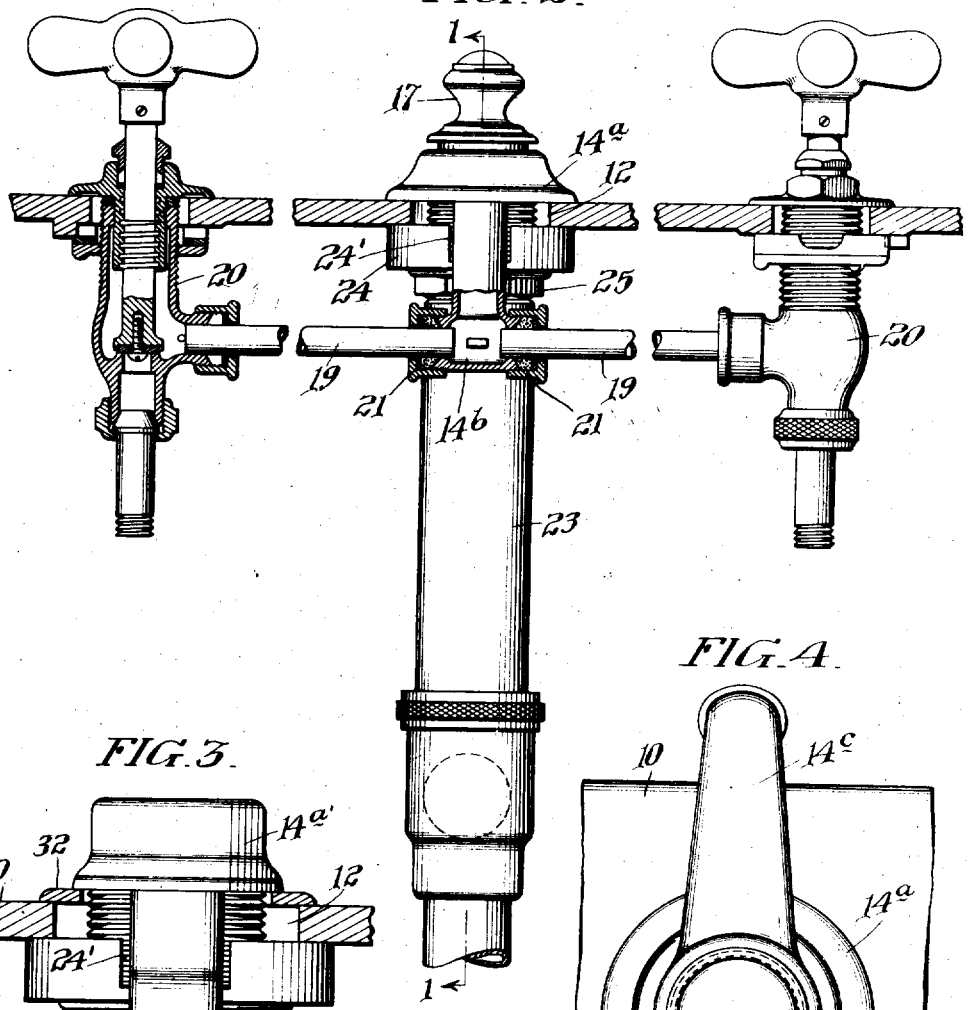
Figure 4:
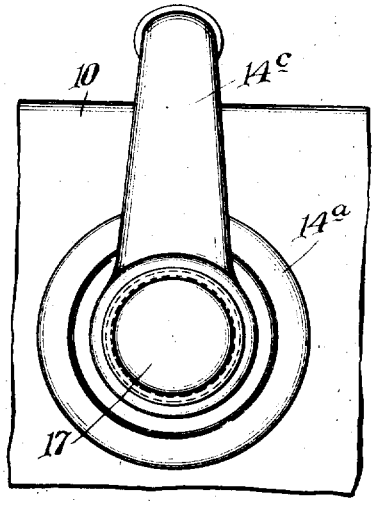
Figure 3:
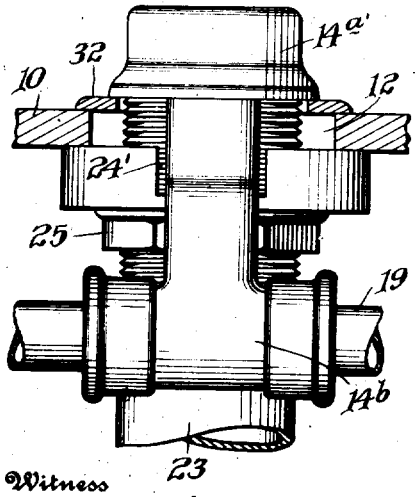
Figure 7:
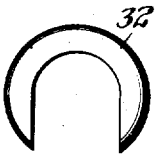

Figure 1 is a vertical section on the line 1—1 of Fig. 2; Fig. 2 is a view at right angles to Fig. 1, taken substantially on the line 2—2 of Fig. 1; Fig. 3 is a view corresponding to Fig. 2 and indicating a modification of delivery nozzle; Fig. 4 is a plan view of the nozzle and waste valve; Figs. 5 and 6 are diagrammatic plan views of different forms of standard basins; Fig. 7 is a plan view of the supporting washer described below; and Fig. 8 is a detailed perspective view of the combination nozzle.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring particularly to Figs. 1 and 2, the numeral 10 indicates a standard form of lavatory basin having a waste opening 11 in its bottom and provided at the rear portion of its top with a hole 12 for the waste valve, and other holes 13 for the hot and cold water spigots. Fig. 5 shows one form of standard basin and Fig. 6 shows another form which has an opening 12′ with slotted sides for the accommodation of a known type of combination fixture, the slotted ends being provided for the purpose of accommodating the hot and cold water connections which lead upwardly to the nozzle from beneath. The ordinary practice in plumbing establishments is to either keep both forms of basins in stock so as to meet the various demands of the trade, or else the type shown in Fig. 5 must be machined so as to transform the hole 12 into that form of hole 12′. This is a costly and troublesome expedient after the basin is manufactured and finished. I provide, therefore, as shown, a peculiar form of nozzle 14 comprising an annular head $14^a$ made hollow to provide an internal water space 14′, a receiving T $14^b$ having its foot connected to the rear portion of said annular head and having its interior communicating with the water space 14′, and a delivery spout projecting from the front side of said head and leading from the water space 14′ into the basin. This construction of combination nozzle provides a central vertical seat 15 for waste pipe or valve stem 16 having at its upper end a knob 17. It also provides a neat and compact means for delivering hot or cold water or both to and through the nozzle and through the standard hole 12 which is ordinarily a two inch hole. The bottom of the nozzle head $14^a$ is substantially flat and is fitted to the upper surface of the basin. This head, however, is provided with an internal thread, as shown at 18, in an annular rabbet formed adjacent said basin.

The T $14^b$ is of a size to accommodate the water pipes 19 leading from the cocks 20. The lateral projecting ends of the T are adapted to receive packing glands 21 to complete the connection between the pipes 19 and the T after the T has been introduced downwardly through the hole 12. The stem of the T $14^b$ is flattened adjacent the annular head $14^a$ and in close proximity to the waste pipe 23, and these characteristics are essential to the passage of both the waste pipe 23 and the T 14[b] through a round basin hole which, as in the case of the central basin hole of a standard basin, is but little larger in diameter than the minimum required to receive the waste pipe 23 alone. The head of the T is offset to make it more remote from the waste pipe 23 and thus facilitate the connection of the glands 21 and pipes 19 to the head of the T. The outer pipe 23 of the waste fixture is screw threaded at its upper end into the head 14[a], as shown in Fig. 1, and the connection between the head and the basin is completed by means of a waste washer 24 held in place by a lock nut 25, and cut away at 24′ to clear the portion of the T 14[b] adjacent the head 14[a].

The lower end of the waste pipe 23 is connected by means of a waste T 26 to the waste arm 27. The arm 27 is connected with the bottom of the basin by means of a strainer L 28 and a strainer 29. Said waste T 26 includes a valve seat 30 for coöperation with a valve 31 carried by the lower end of the inner pipe 16. The cocks 20 may be of any ordinary or approved construction and control the delivery of hot and cold water into and through the pipes 19 into the combination nozzle, all of the water being delivered through the single pipe or nozzle 14[c].

The slight modification of Fig. 3 shows the same general plan, namely, the nozzle provided with an annular head 14[a]′ and a receiving T 14[b] communicating therewith. The head of this form of combination nozzle is made relatively smaller than the other and is therefore adapted to pass upwardly through the opening 12 in the basin. This nozzle is maintained in elevated position, therefore, by a horseshoe shaped washer 32 slipped between the base thereof and the upper surface of the basin. The manner of securing the nozzle in place is substantially the same as above described, including the waste washer 24 and lock nut 25.

Having thus described my invention, I claim as new and desire to secure by Letters Patent:—

1. The combination with a lavatory basin having a plurality of vertical holes through the top, of a combination nozzle fixture therefor including hot and cold water cocks secured in certain of said holes, the combination nozzle comprising an annular head located above the upper surface of the basin and formed with an internal water space, a waste pipe connected to said head and extending downwardly therefrom through the remaining basin hole, a waste valve in said pipe, connections between the bottom of the basin and said pipe, a receiving T connected at its foot to said head and having its interior communicating with said internal water space and extending downward through said remaining basin hole alongside of said waste pipe, the portion of said T adjacent said head being in close proximity to said waste pipe and shaped to permit said pipe and T to both pass through the same round basin hole, but little larger in diameter than would be required to receive the waste pipe alone, and means to deliver hot and cold water through said cocks into said receiving T.

2. As an article of manufacture, a combination nozzle of the character set forth comprising a hollow annular head providing a circular passageway for hot or cold water, a receiving T connected to and communicating with one portion of said head passageway, and a delivery spout communicating with and extending from another portion of said head.

3. The herein described lavatory fixture comprising a combination nozzle including a hollow annular head having an internal thread, a receiving T communicating with the rear portion of said head, and a delivery spout extending from the front portion of the head, means to secure the nozzle to a standard basin, said securing means including a main waste pipe having engagement in said nozzle head thread, locking devices coöperating with said waste pipe, and means to deliver hot and cold water to and through said receiving T, substantially as set forth.

4. The combination with a lavatory basin having a plurality of vertical holes through the top, of a combination nozzle fixture therefor including hot and cold water cocks secured in certain of said holes, the combination nozzle comprising an annular head located above the upper surface of the basin and formed with an internal water space, a waste pipe connected to said head and extending downwardly therefrom through the remaining basin hole, a waste valve in said pipe, connections between the bottom of the basin and said pipe, a receiving T connected at its foot to said head and having its interior communicating with said internal water space and extending downward through said remaining basin hole alongside of said waste pipe, the portion of said T adjacent said head being in close proximity to said waste pipe and shaped to permit said pipe and T to both pass through the same round basin hole, but little larger in diameter than would be required to receive the waste pipe alone, means for securing said head to said basin comprising a nut threaded on said waste pipe and a washer interposed between said nut and basin and cut away to clear said receiving T, and means to deliver hot and cold water through said cocks into the receiving T.

5. The herein described lavatory fixture comprising a combination nozzle including an annular head having an internal water space, a receiving T having its foot connected to the under side of said head and its interior in communication with said water space, a delivery spout projecting from said head and communicating with the water space therein, and a waste pipe connected to said head and adapted to receive a tubular waste valve having an operating portion surrounded by said annular head, said receiving T comprising a flattened stem portion adjacent said annular head in close proximity to said waste pipe and a head portion more remote from said waste pipe.

6. The herein described lavatory fixture comprising a combination nozzle including an annular head having an internal water space, a receiving T having its foot connected to the under side of said head and its interior in communication with said water space, a delivery spout projecting from said head and communicating with the water space therein, a waste pipe connected to said head and adapted to receive a tubular waste valve having an operating portion surrounded by said annular head, said receiving T comprising a flattened stem portion adjacent said annular head in close proximity to said waste pipe and an offset head portion more remote from said waste pipe, and means for securing said nozzle in place on a standard three hole basin, with the waste pipe and T passing through the central hole of the basin comprising a nut threaded on said waste pipe and a washer surrounding the waste pipe and adapted to extend between said nut and the under side of the basin slab and cut away to clear the portion of said T in closest proximity to said waste pipe.

WILLARD A. SPEAKMAN.

Witnesses:

CHARLES G. GUYER,

JOHN E. HUBBELL.